United States Patent
Ponnampalam et al.

(10) Patent No.: US 8,391,383 B2
(45) Date of Patent: Mar. 5, 2013

(54) DYNAMIC TONE GROUPING AND ENCODING FOR MULTI-CARRIER QUADRATURE AMPLITUDE IN OFDM

(75) Inventors: Vishakan Ponnampalam, San Jose, CA (US); Kun-Chien Hung, Kanding Township, Pingtung County (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 145 days.

(21) Appl. No.: 12/930,111

(22) Filed: Dec. 27, 2010

(65) Prior Publication Data

US 2011/0158348 A1  Jun. 30, 2011

Related U.S. Application Data

(60) Provisional application No. 61/290,409, filed on Dec. 28, 2009, provisional application No. 61/290,971, filed on Dec. 30, 2009.

(51) Int. Cl.
*H04K 1/10* (2006.01)
*H04L 27/28* (2006.01)

(52) U.S. Cl. ........ 375/260; 375/267; 375/299; 370/203; 370/208; 370/210

(58) Field of Classification Search .......... 375/260–261, 375/267, 298–299; 370/203–211
See application file for complete search history.

(56) References Cited

U.S. PATENT DOCUMENTS

| | | | |
|---|---|---|---|
| 2005/0147076 A1 | 7/2005 | Sadowsky et al. | 370/343 |
| 2009/0154618 A1* | 6/2009 | Chang et al. | 375/346 |
| 2011/0033004 A1 | 2/2011 | Wang et al. | 375/261 |
| 2011/0051825 A1 | 3/2011 | Tao et al. | 375/260 |

FOREIGN PATENT DOCUMENTS

| | | |
|---|---|---|
| CN | 1864360 | 11/2006 |
| CN | 1960357 | 5/2007 |
| WO | WO 2009128030 A1 | 10/2009 |

OTHER PUBLICATIONS

International Search Report and Written Opinion of International Search Authority for PCT/CN2010/080391 dated Apr. 7, 2011 (11 pages).

* cited by examiner

*Primary Examiner* — Curtis Odom
(74) *Attorney, Agent, or Firm* — Imperium Patent Works; Zheng Jin

(57) ABSTRACT

A method of dynamic tone grouping (DTG) used by a transmitter in a wireless OFDM system is proposed. First, a sequence of coded and interleaved bits is de-multiplexed into a number of bit-streams. Each bit-stream is mapped into a sequence of QAM symbols, which are grouped into non-overlapping sets of QAM symbols. Unitary transformation is then applied on the QAM symbols to produce groups of complex signals. Finally, the complex signals are dynamically mapped to subcarrier groups based on tone mapping information to improve link performance. The tone mapping information is derived from information associated with each OFDM subcarrier, such as channel state information (CSI). The OFDM subcarriers are grouped into subcarrier groups according to the tone mapping information such that the channel quality of each subcarrier group is balanced. In addition, the tone mapping information is efficiently encoded and transmitted to/from a corresponding receiver.

25 Claims, 8 Drawing Sheets

US 8,391,383 B2

DYNAMIC TONE GROUPING AND ENCODING FOR MULTI-CARRIER QUADRATURE AMPLITUDE IN OFDM

CROSS REFERENCE TO RELATED APPLICATIONS

This application claims priority under 35 U.S.C. §119 from U.S. Provisional Application No. 61/290,409, entitled "Dynamic Tone Grouping Method for Multi-Carrier Quadrature Amplitude Modulation in OFDM," filed on Dec. 28, 2009, U.S. Provisional Application No. 61/290,971, entitled "OFDM Transmission with Dynamic Tone Group Scheme Using Reduced Signaling Overhead," filed on Dec. 30, 2009, the subject matter of which is incorporated herein by reference.

TECHNICAL FIELD

The disclosed embodiments relate generally to transmitter and receiver design, and, more particularly, to dynamic tone grouping (DTG) for multi-carrier Quadrature Amplitude Modulation (MC-QAM) in OFDM systems.

BACKGROUND

Wideband fading, also known as multipath fading, adversely affects the throughput and spectral efficiency of a wireless communication system. When data is transmitted from a transmitter to a receiver via a radio propagation channel, the fading introduced by the radio propagation channel needs to be equalized by the receiver in order for it to recover the transmitted data. Orthogonal Frequency Division Multiplexing (OFDM) is widely used in modern communication due to its inherent robustness to wideband fading. OFDM effectively converts a wide bandwidth channel into a set of sub-channels of narrow bandwidth, which are used to transmit data. These sub-channels, also referred to as subcarriers, experience narrowband fading. Equalization of narrowband fading requires substantially lower computational complexity. With OFDM, in the presence of multipath fading, each subcarrier typically experiences a different level of fading. Data transmitted on different subcarriers are thus received with different reliabilities. For example, data received on a subcarrier with higher fading (i.e., attenuation) is more likely to be in error relative to data received on a subcarrier with lower level of fading (i.e., attenuation).

Channel coding is employed to exploit this disparity in the subcarrier channel quality. The transmitter applies channel coding to the data before mapping it onto OFDM subcarriers. The receiver employs a channel decoder to recover the information after performing OFDM demodulation. A soft decoder is able to process received signal reliability values thus taking into account channel reliabilities corresponding to each subcarrier. Channel coding combined with soft decision decoding plays a critical role in OFDM systems—not only providing coding gain but also exploiting frequency diversity, and thus providing diversity gain.

Diversity gain can be better exploited by applying a diversity technique, in addition to channel coding. A simple yet very effective way of obtaining frequency diversity gain in OFDM systems is through the application of Multi-Carrier Quadrature Amplitude Modulation (MC-QAM). In MC-QAM based OFDM systems, a set of QAM symbols are transformed and mapped onto a set of OFDM subcarriers. Note that this is in contrast to conventional OFDM systems, where individual QAM symbols are mapped to individual OFDM subcarriers. MC-QAM Modulator transforms sets of QAM symbols such that the MC-QAM can recover the transmitted QAM symbols even in cases when one of the set of subcarriers to which the set of QAM symbols are mapped are severely attenuated by the radio propagation channel.

FIG. 1 (Prior Art) is a block diagram of a transmitter 11 and a receiver 12 in a traditional OFDM system 10. The main functional blocks of a typical OFDM transmitter 11 includes a de-multiplexer, a plurality of channel encoders, a plurality of QAM mappers, an interleaver, and an Inverse Fast Fourier Transform (IFFT) & Cyclic Prefix (CP) insertion module. At the transmitter side, input data 14 (e.g., a sequence of bits) is split into one or more parallel bit-streams by the de-multiplexer. Each bit-stream is encoded into different coding blocks by each of the plurality of channel encoders. Each encoded bit-stream is then mapped onto QAM symbol constellations points by each of the plurality of QAM mappers, resulting in a stream of QAM symbols. The QAM symbols belonging to the different coding blocks are then interleaved by the interleaver. Finally, IFFT is applied and a CP is inserted such that data signal 15 is transmitted via radio propagation channel 13.

The main functional blocks of a corresponding OFDM receiver 12 includes a CP removal & Fast Fourier Transform (FFT) module, a de-interleaver, a plurality of QAM de-mappers, a plurality of channel decoders, and a multiplexer. At the receiver side, the CP is removed from the received data signal 16 and FFT is applied. The signal is then de-interleaved into one or more streams corresponding to one or more coding blocks by the de-interleaver. Each stream is de-mapped by each of the plurality of QAM de-mappers, and then decoded by each of the plurality of channel decoder. Finally, the one or more streams are multiplexed into a sequence of output bits as output data 17 by the multiplexer.

In traditional OFDM system 10, radio propagation channel 13 contains a set of subcarriers, and each QAM symbol is mapped to a corresponding subcarrier based on some fixed or predetermined rules. Adaptive or dynamic mapping rule, however, would be desirable because it improves the overall performance of the channel link at a marginal additional cost in computational complexity and signaling overhead.

SUMMARY

A method of dynamic tone grouping (DTG) used by a transmitter in a wireless OFDM system is proposed. First, a sequence of coded and interleaved bits is de-multiplexed into a number of bit-streams. Each bit-stream is mapped into a sequence of MC-QAM symbols, which are grouped into non-overlapping groups of QAM symbols. Unitary transformation is then applied on the QAM symbols to produce groups of complex signals. Finally, the complex signals are dynamically mapped to subcarrier groups based on tone mapping information to improve link performance. The tone mapping information is derived from information associated with each OFDM subcarrier, such as channel state information (CSI). A common application of DTG involves an OFDM system that employs MC-QAM group size equals to two. This type of modulation is referred to as Dual Carrier Modulation (DCM).

In a first embodiment of DTG, each OFDM subcarrier group is allocated with the best and the worst subcarriers such that, empirically, the channel conditions associated with each subcarrier group is substantially balanced. In a second embodiment of DTG, subcarrier groups are chosen such that variance of the mean power corresponding to the subcarrier groups is minimized. In a third embodiment of DTG, subcarrier groups are chosen such that minimum of the mean power corresponding to the subcarrier group is maximized.

The DTG operation is equivalent to deriving a permutation of subcarrier indices 1, 2, 3, ..., M, such that each MC-QAM symbol group is mapped to a corresponding subcarrier group to achieve improved link performance. Therefore, the permutation of subcarriers indices, i.e., the DTG tone mapping information used by a transmitter, need to be informed to a corresponding receiver at the other end of the communication link. In one novel aspect, block-wise DTG scheme is used to reduce signaling overhead. Furthermore, efficient tone mapping information encoding is utilized to further reduce signaling overhead. In a first example of partial index encoding, a subcarrier group pair is first selected using one group index according to a rule, and the other group index of the selected subcarrier group pair is encoded. In a second example of partial pair encoding, only the subcarrier group pairs with large metric difference are encoded. The remaining subcarrier group pairs can be determined using a predefined rule known by both the transmitter and the receiver.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
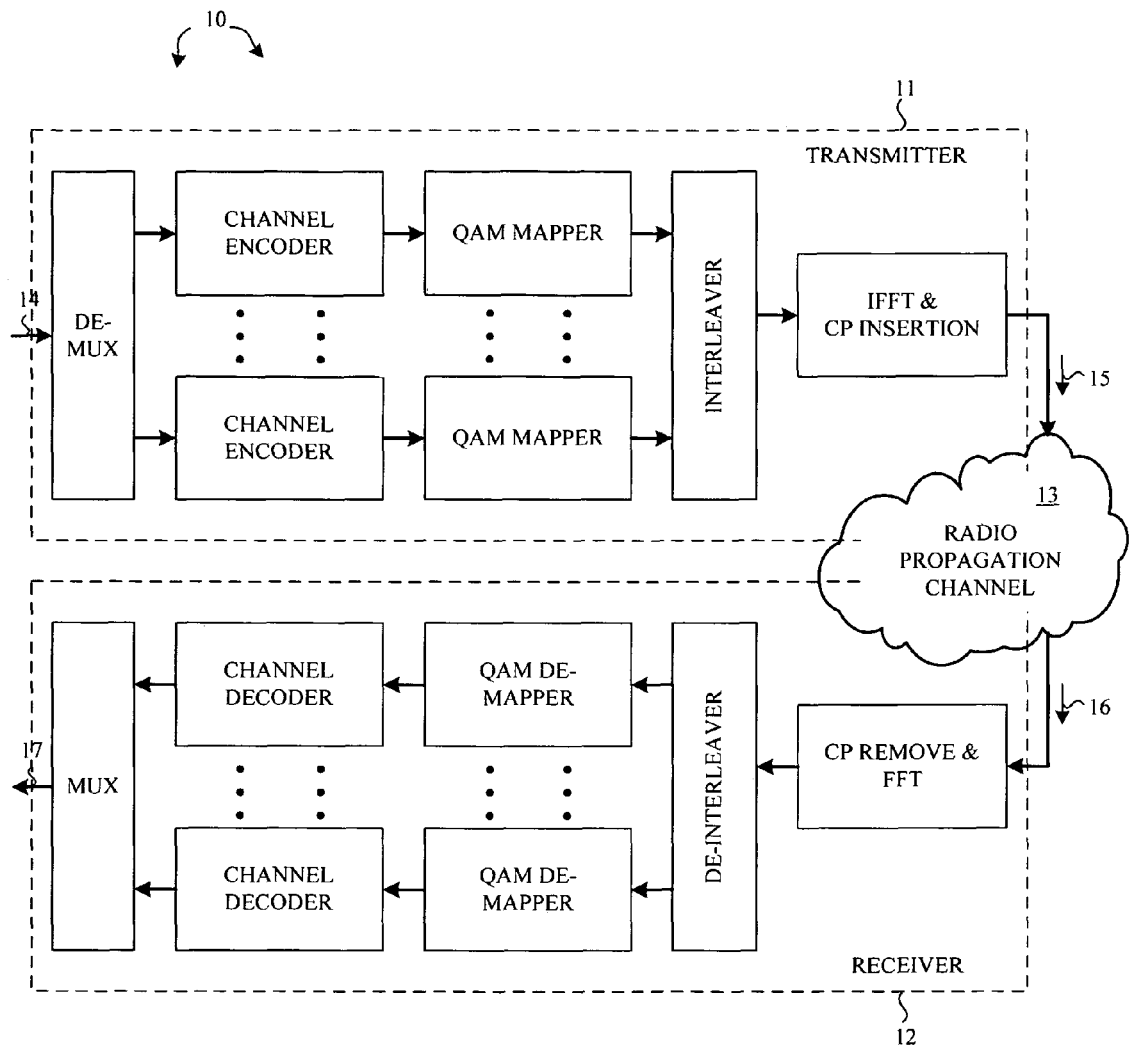
FIG. 1 (Prior Art) is a block diagram of a traditional transceiver in a wireless OFDM system.
Figure 2:
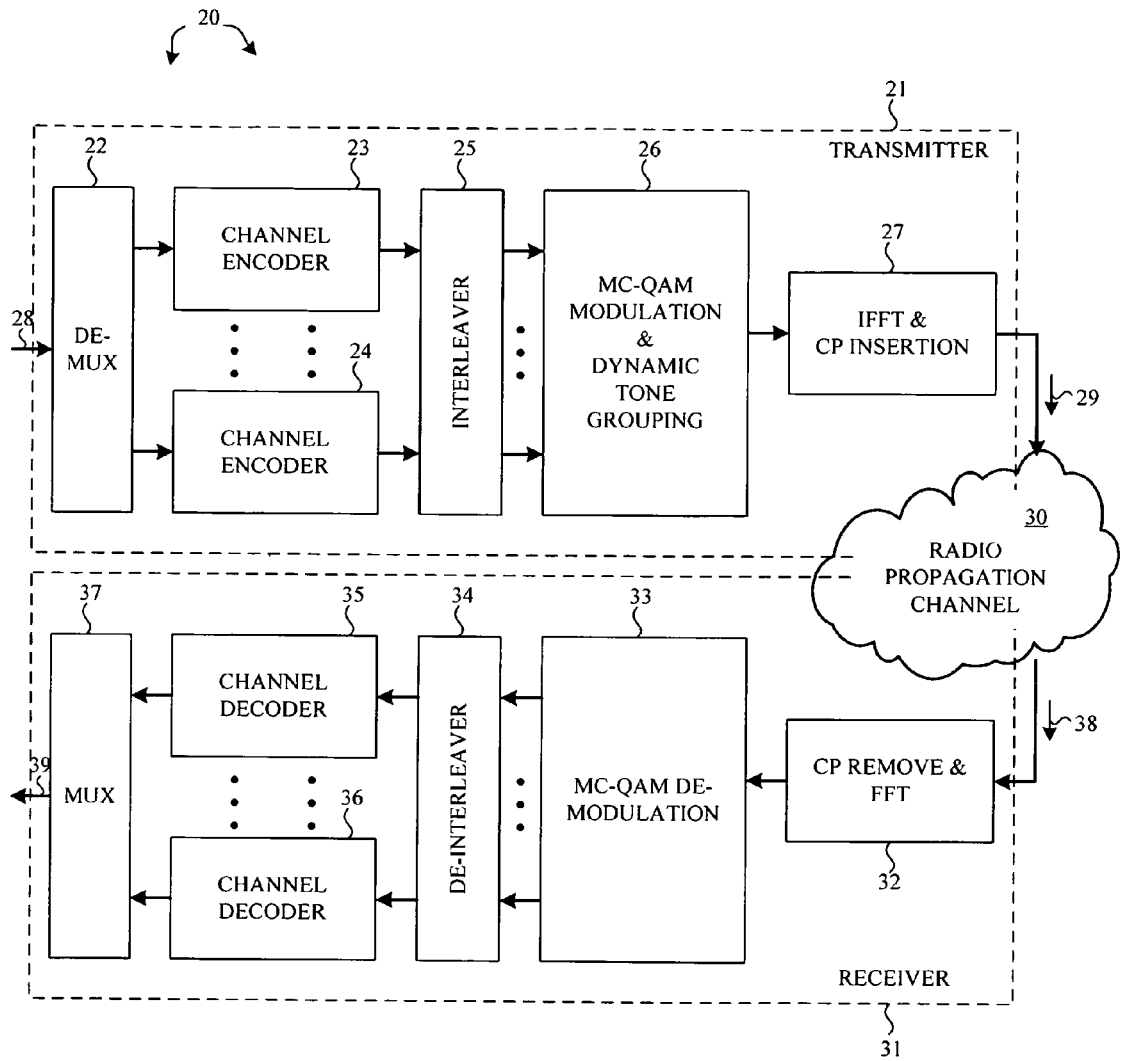
FIG. 2 is a block diagram of a transceiver in a wireless OFDM system in accordance with one novel aspect.

FIG. 2 is a block diagram of a transmitter 21 and a receiver 31 in a wireless Orthogonal Frequency Division Multiplexing (OFDM) system 20 in accordance with one novel aspect. At the transmitter side, transmitter 21 comprises a de-multiplexer 22 that de-multiplexes input data 28 (e.g., a sequence of bits) into a number of parallel bit-streams, a plurality of channel encoders (e.g., 23-24 depicted) that encode the bit-streams into different coding blocks, an interleaver 25 that interleaves the encoded bit-streams, a Multi-Carrier Quadrature Amplitude Modulation (MC-QAM) and Dynamic Tone Grouping (DTG) block 26 that modulates the encoded and interleaved bit-streams to QAM symbols and maps the QAM symbols to OFDM subcarriers (i.e., frequency tones), and an Inverse Fast Fourier Transform (IFFT) and Cyclic Prefix (CP) insertion block 27 that applies IFFT and inserts a CP such that a data signal 29 is transmitted via radio propagation channel 30. At the receiver side, receiver 31 comprises a CP removal and Fast Fourier Transform (FFT) block 32 that removes the CP from the received signal 38 and applies FFT, a MC-QAM demodulator 33 that de-maps and de-modulates the QAM symbols, a de-interleaver 34 that de-interleaves the bit-streams into corresponding coding blocks, a plurality of channel decoders (e.g., 35-36 depicted) that decode the bit-streams, and a multiplexer 37 that multiplexes the bit-streams into a sequence of bits as output data 39. In one novel aspect, the overall performance of radio propagation channel 30 may be significantly improved if the mapping of QAM symbols to OFDM subcarriers by MC-QAM modulation and DTG block 26 is performed dynamically, adapted to channel conditions of the OFDM subcarriers.

Figure 3:
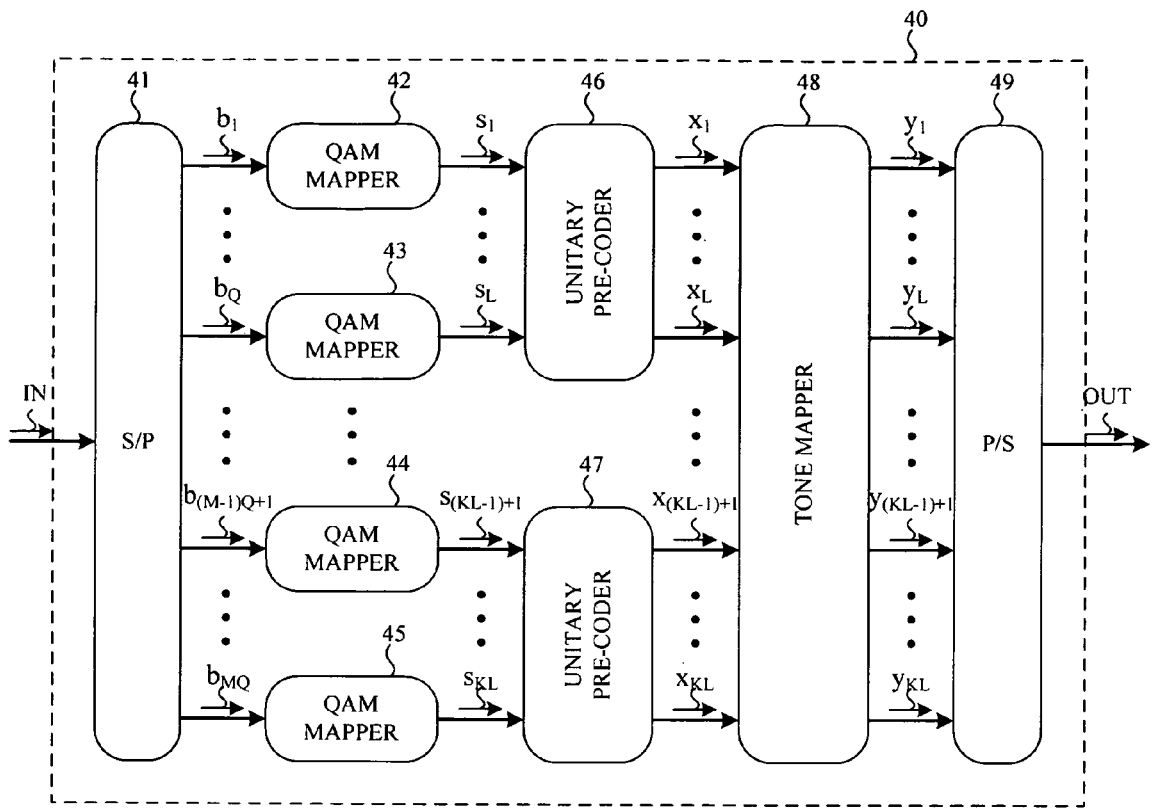
FIG. 3 is a block diagram of a MC-QAM modulation and Dynamic Tone Grouping block of a transmitter in accordance with one novel aspect.

FIG. 3 is a block diagram of a novel MC-QAM and DTG block 40 of a transmitter in an OFDM system in accordance with one novel aspect. The novel MC-QAM and DTG block 40 takes a sequence of bits as its input, produces a sequence of complex valued signal points, ordered according to OFDM subcarriers to which they are mapped, as its output. Consider an OFDM system that employs M OFDM subcarriers carrying a total of MQ bits. First, a sequence of coded and interleaved bits of length MQ is taken as input data IN. The sequence of MQ input bits is de-multiplexed by a serial to parallel (S/P) block 41 into M bit-streams b, each bit-stream of length Q. Next, M QAM mappers (e.g., 42-45 depicted) are used to map each Q-length bit-stream into a sequence of M $2^Q$-QAM symbols s. Unitary transformation is then applied on K=M/L non-overlapping sets of L QAM symbols s to produce K sets of complex signals x by K unitary pre-coders (e.g., 46-47 depicted). Finally, each set of complex signals x are mapped to groups of OFDM subcarriers by a tone mapper 48 where those groups of subcarriers are chosen dynamically based on certain information, such as channel state information (CSI). The complex signals x are ordered according to the M OFDM subcarriers to which they are mapped to signals y and multiplexed by parallel to serial (P/S) block 49 to generate output data OUT. The detailed process of QAM modulation, unitary precoding, and dynamic tone mapping are described mathematically below associated with FIGS. 4, 5, and 6 respectively.

Figure 4:
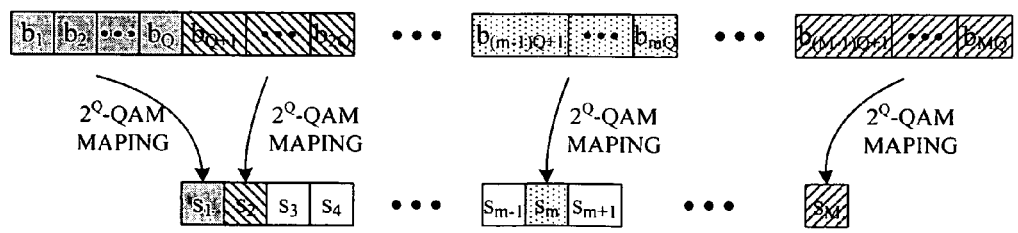
FIG. 4 illustrates a QAM modulation process that generates a number of QAM symbols.

FIG. 4 illustrates a QAM modulation process that generates a number of QAM symbols by a number of QAM mappers. As illustrated in FIG. 4, a bit-stream of length MQ bits is converted into a sequence of M $2^Q$-QAM symbols by mapping each consecutive Q bits to a $2^Q$-QAM symbol. The sequence of QAM symbols is given by s=[$s_1, s_2, \ldots, s_M$]. For example, bit-stream [$b_1, b_2, \ldots, b_Q$] is mapped to a constellation point (symbol $s_1$) in accordance with a $2^Q$ constellation pattern, and bit-stream [$b_{(M-1)Q+1}, b_{(M-1)Q+2}, \ldots, b_{MQ}$] is mapped to a constellation point (symbol $s_M$) in accordance with the same $2^Q$ constellation pattern.

Figure 5:
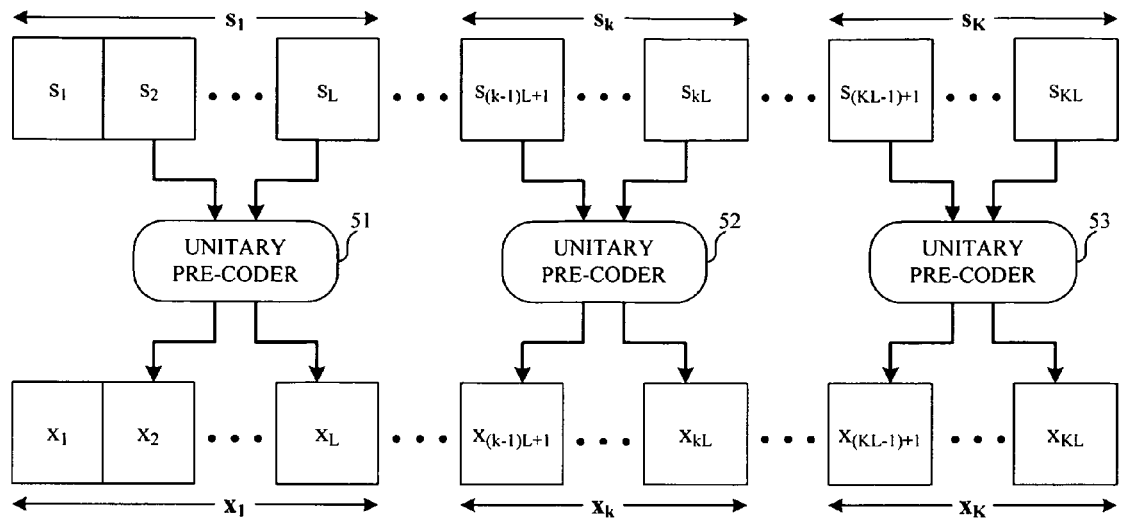
FIG. 5 illustrates a unitary precoding process that transforms QAM symbols into complex signals.

FIG. 5 illustrates a unitary precoding process that transforms a number of QAM symbols into complex signals by a number of unitary pre-coders. The M $2^Q$-QAM symbols carried in a single OFDM symbol are first grouped into K groups of L consecutive symbols, where M=K×L. The K groups of QAM symbols is given by s=[s$_1$, s$_2$, ..., s$_K$]. A transformation operation, referred to as Unitary Precoding, is applied to each group of QAM symbols to produce K groups of L complex signals x=[x$_1$, x$_2$, ..., x$_K$], as illustrated in FIG. 5. For example, s$_1$=[s$_1$, s$_2$, ..., s$_L$] is transformed to x$_1$=[x$_1$, x$_2$, ..., x$_L$] by unitary pre-coder 51, and s$_K$=[s$_{(K-1)L+1}$, s$_{(K-1)L+2}$, ..., s$_{KL}$] is transformed to x$_K$=[x$_{(K-1)L+1}$, x$_{(K-1)L+2}$, ..., x$_{KL}$] by unitary pre-coder 53.

Mathematically and computationally, let s$_k$=[s$_{(k-1)L+1}$, s$_{(k-1)L+2}$, ..., s$_{kL}$]$^T$ denote the kth group of $2^Q$-QAM symbols as a column vector. Each set of L $2^Q$-QAM symbols are transformed into a set of L complex signals, x$_k$=[x$_{(k-1)L+1}$, x$_{(k-1)L+2}$, ..., x$_{kL}$]$^T$, belonging to a larger symbol constellation by a unitary transformation. The real and imaginary parts of x$_k$=Re[x$_k$]+jIm[x$_k$] are computed as Re[x$_k$]=W$_{Re}$ Re[s$_k$], and Im[x$_k$]=W$_{Im}$ Im[s$_k$], where W$_{Re}$ and W$_{Im}$ denote real-values L*L unitary matrices applied to each set of L $2^Q$-QAM symbols. In general, the matrices need to be matched to the QAM constellation and channel coding scheme used by the system. For example, $$W_{Re} = W_{Im} = \frac{1}{\sqrt{5}}\begin{bmatrix} \pm 2 & \pm 1 \\ \pm 1 & \mp 2 \end{bmatrix}$$

may be used with QPSK modulation and $$W_{Re} = W_{Im} = \frac{1}{\sqrt{17}}\begin{bmatrix} \pm 4 & \pm 1 \\ \pm 1 & \mp 4 \end{bmatrix}$$

may be employed in conjunction with 16-QAM modulation.

Figure 6:
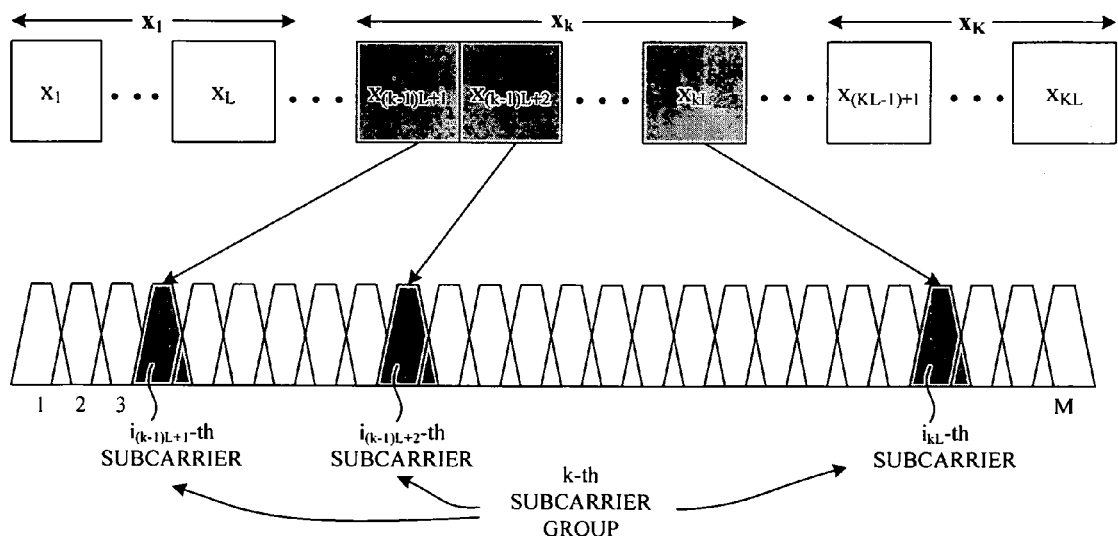
FIG. 6 illustrates a tone mapping process that dynamically maps transformed complex signals onto OFDM subcarriers.

FIG. 6 illustrates a tone mapping process that dynamically maps transformed complex signals onto OFDM subcarriers. As illustrated in FIG. 6, the transformed symbols x=[x$_1$, x$_2$, ..., x$_K$]=[x$_1$, x$_2$, ..., x$_L$, x$_{L+1}$, x$_{L+2}$, ..., x$_{2L}$, x$_{(k-1)L+1}$, x$_{(k-1)L+2}$, ..., x$_{kL}$, ..., x$_{M=KL}$] are mapped onto OFDM subcarriers indexed i=[i$_1$, i$_2$, ..., i$_K$]=[i$_1$, i$_2$, ..., i$_L$, i$_{L+1}$, i$_{L+2}$, ..., i$_{2L}$, ..., i$_{(k-1)L+1}$, i$_{(k-1)L+2}$, ..., i$_{kL}$, ..., i$_{M=KL}$]. For example, the transformed k-th MC-QAM group of symbols x$_k$=[x$_{(k-1)L+1}$, x$_{(k-1)L+2}$, ..., x$_{kL}$] is mapped to OFDM subcarriers with the set of subcarrier indices given by i$_k$=[i$_{(k-1)L+1}$, i$_{(k-1)L+2}$, ..., i$_{kL}$], respectively (as denoted by shaded area in FIG. 6). The overall performance of the communication link may be significantly improved if the mapping of symbol groups to subcarrier groups is performed dynamically, adapted to channel conditions, as described with details below.

Let the vector h=[h$_1$, h$_2$, h$_3$, ..., h$_{M=KL}$] denote the frequency domain channel response of M OFDM subcarriers, where the complex scalar h$_m$ denotes the channel state of the m-th OFDM subcarrier. The dynamic tone grouping function, $f$, determines the sets of subcarrier indices i=[i$_1$, i$_2$, i$_3$, ..., i$_k$, ... ] based on the channel response h, where i=[i$_1$, i$_2$, i$_3$, ..., i$_k$, ... ] correspond to a non-overlapping partition of all M OFDM subcarriers in to K equal subsets of L subcarriers. The dynamic tone grouping function is, mathematically, denoted as $f$(h)→i=[i$_1$, i$_2$, i$_3$, ..., i$_k$, ... ] such that i$_p$∩i$_q$=∅ and i$_1$∪i$_2$∪ ... i$_k$={1, 2, 3, ..., M}, where i belongs to $\Im_M$, the set of all permutations of the set of integer {1, 2, 3, ..., M}. To those skilled in the art, it will be evident that dynamic tone grouping operation is equivalent to deriving i=[i$_1$, i$_2$, i$_3$, ..., i$_k$, ... ], a permutation of indices 1, 2, 3, ..., M, such that each MC-QAM symbol group is mapped to a corresponding subcarrier group to achieve improved link performance. Dynamic tone grouping function $f$ may employ a range of optimization or other computational methods in order to derive the sets of subcarrier indices for each MC-QAM symbol group. Three different embodiments of DTG are now described below.

Figure 7:
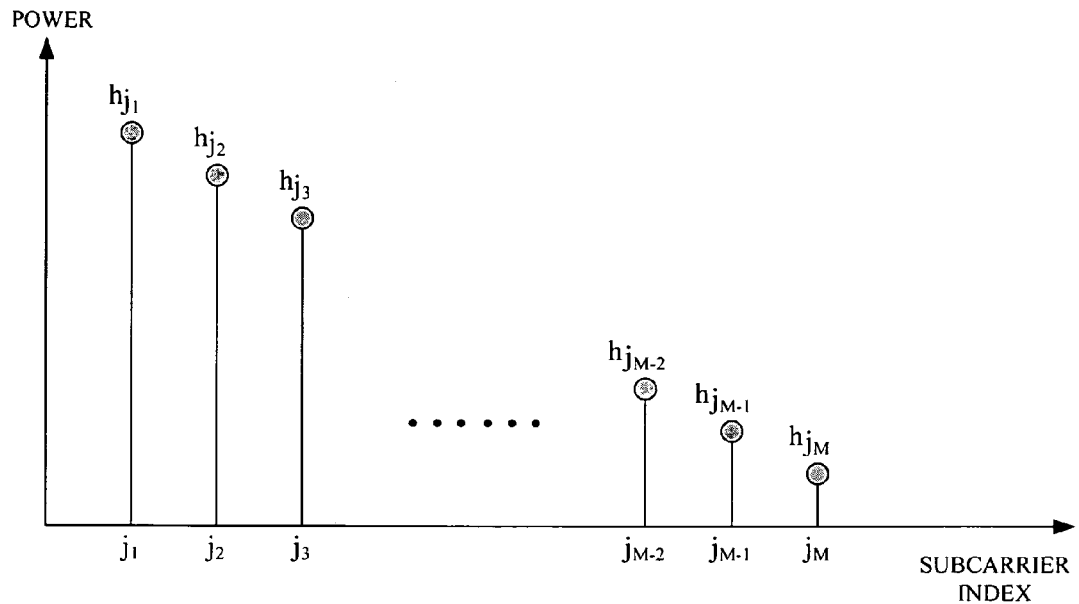
FIG. 7 illustrates a permutation that sorts OFDM subcarriers according to a specific channel quality metric.

In a first embodiment (e.g., Method A) of DTG, each OFDM subcarrier group is allocated with the best and the worst subcarriers such that, empirically, the channel conditions associated with each subcarrier group is substantially balanced. FIG. 7 illustrates a permutation j=$\Im_M$ that sorts the OFDM subcarriers in according to a specific channel quality metric, such as power. More specifically, j=[j$_1$, j$_2$, ..., j$_{M=LK}$] such that $\|h_{j1}\|^2 <= \|h_{j2}\|^2 <= \|h_{j3}\|^2 <= ... <= \|h_{jM}\|^2$, where h$_{jm}$ indicates the power associated with subcarrier j$_m$. It should be noted that although power is used as one of the channel quality metric in FIG. 7, alternative channel quality metrics (e.g., metrics derived from CSI) might be used. Such alternative metrics include, but are not limited to: a) Signal to Noise Ratio (SNR), b) Signal to Interference plus Noise Ratio (SINR), c) Channel Capacity, and d) Mutual Information. Based on the ordering of the sorted OFDM subcarriers, dynamic tone grouping is then performed to produce the permutation i$^{(A)}$=[i$_1^{(A)}$, i$_2^{(A)}$, ..., i$_k^{(A)}$, ..., i$_K^{(A)}$] of the subcarrier indices such that each subcarrier group has balanced channel condition. Typically, under Method A, the strongest frequency tones and the weakest frequency tones are substantially evenly distributed among all the subcarrier groups, while moderately strong or weak frequency tones can be arbitrarily distributed among all the subcarrier groups.

Figure 8:
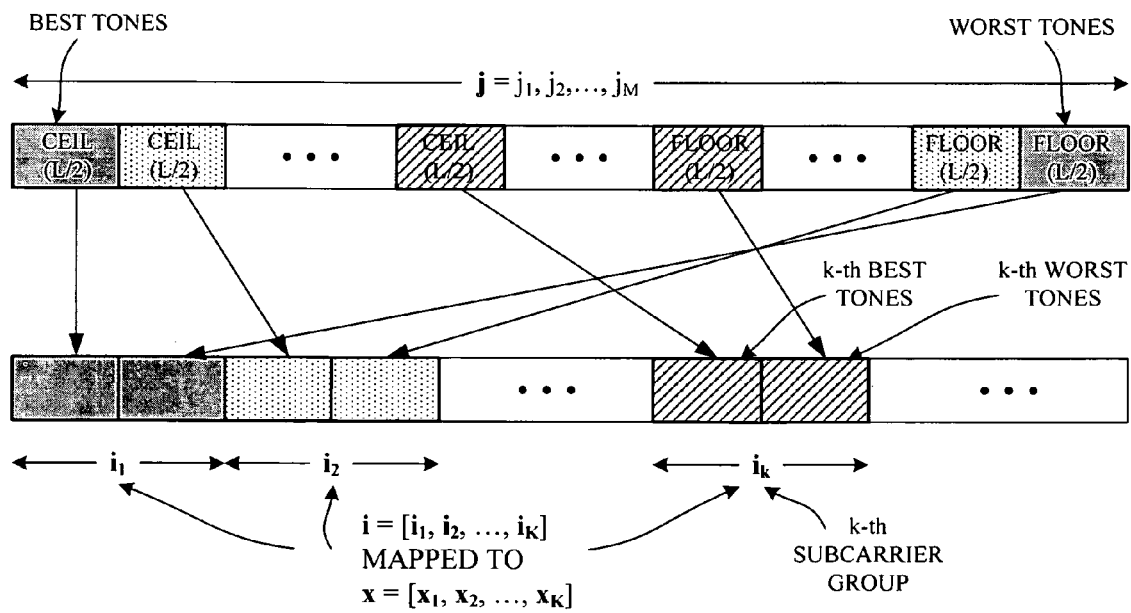
FIG. 8 illustrates one embodiment of dynamic tone grouping that evenly allocates the best and the worst subcarriers into each subcarrier group.

FIG. 8 illustrates one example in which each OFDM subcarrier group is allocated with the best and the worst subcarriers under Method A. First, the subcarrier indices are initially ordered to a permutation j=$\Im_M$ according to a specific channel quality metric of each subcarrier. Second, based on this ordering, dynamic tone grouping is performed to produce the permutation i$^{(A)}$=[i$_1^{(A)}$, i$_2^{(A)}$, ..., i$_k^{(A)}$, ..., i$_K^{(A)}$] where the k-th subcarrier group indices i$_k^{(A)}$=[i$_{L(k-1)+1}^{(A)}$, i$_{L(k-1)+2}^{(A)}$, ..., i$_{L(k)}^{(A)}$] corresponding to the k-th MC-QAM group is given by:

$$i_{L(k-1)+l} = \begin{cases} j_{(k-1)\lceil L/2\rceil+l} & l=1, 2, \ldots, \lfloor L/2 \rfloor \\ j_{M-k\lfloor L/2\rfloor+(l-\lceil L/2\rceil)} & l=\lceil L/2\rceil+1, \lceil L/2\rceil+2, \ldots, L \end{cases}.$$

Finally, the k-th MC-QAM symbol group x$_k$ is then mapped to the k-th subcarrier group with indices i$_k$. The k-th subcarrier group has a block of L subcarriers consisting of the k-th worst subblock of subcarriers (consisting of floor (L/2) subcarriers) and the k-th best subblock of subcarriers (consisting of ceiling (L/2) subcarriers). In one example, if L is equal to two, then groups of two QAM symbols are transformed and mapped to two OFDM subcarriers. Thus, dynamic tone grouping under Method A corresponds to form MC-QAM subcarrier groups by pairing the worst subcarrier with the best, the second worst with the second best and so on so forth, where the quality of the channel is measured by channel response.

Method A may be further illustrated with the following example pertaining to an OFDM system with parameters M=4 (OFDM subcarriers), L=2 (MC-QAM group size), and K=M/L=2 (number of MC-QAM groups per OFDM symbol). Suppose that the frequency domain channel response is known to be h=[h$_1$=0.5, h$_2$=2.75, h$_3$=2, h$_4$=−1.5]. First, subcarrier indices j=[j$_1$, j$_2$, j$_3$, j$_4$] are computed such as to order the subcarriers with respect to ascending order of their corresponding channel response. As a result, subcarrier indices j=[$j_1$=1, $j_2$=4, $j_3$=3, $j_4$=2]. Next, the first MC-QAM group is mapped to the 1-st (worst) and the 2-nd (best) OFDM subcarriers while the second MC-QAM group is mapped to the 4-th (second-worst) and 3-rd (second-best) OFDM subcarriers. In other words, the dynamic tone grouping Method A produces the subcarrier index permutation i=[$i_1$=1, $i_2$=2, $i_3$=4, $i_4$=3].

In a second embodiment (e.g., Method B) of DTG, MC-QAM subcarrier groups are chosen such that variance of the mean power corresponding to the subcarrier groups is minimized. Mathematically the dynamic tone grouping by the equivalent permutation of indices is denoted as $$i^{(B)} = [i_1^{(B)}, i_2^{(B)}, \ldots, i_k^{(B)}, \ldots, i_K^{(B)}] = \arg\min_{i \in \mathcal{J}_M} \text{var}(\gamma_1, \gamma_2, \ldots, \gamma_k, \ldots, \gamma_K)$$

where $\gamma_k$ denotes the mean power of the k-th MC-QAM subcarrier group, with subcarrier indices $i_k^{(B)} = [i_{L(k-1)+1}^{(B)}, i_{L(k-1)+2}^{(B)}, \ldots, i_{L(k)}^{(B)}]$, given by $$\gamma_k = \frac{1}{L} \sum_{m=L(k-1)+1}^{Lk} \|h_{i_m}\|^2$$

and var( ) denotes the variance of the entries within the parenthesis.

In a third embodiment (e.g., Method C) of DTG, MC-QAM subcarrier groups are chosen such that minimum of the mean power corresponding to the subcarrier group is maximized. Mathematically the dynamic tone grouping by the equivalent permutation of indices is denoted as $$i^{(C)} = [i_1^{(C)}, i_2^{(C)}, \ldots, i_k^{(C)}, \ldots, i_K^{(C)}] = \arg\max_{i \in \mathcal{J}_M} \min(\gamma_1, \gamma_2, \ldots, \gamma_k, \ldots, \gamma_K)$$

where $\gamma_k$ denotes the mean power of the k-th MC-QAM subcarrier group, with subcarrier indices $i_k^{(C)} = [i_{L(k-1)+1}^{(C)}, i_{L(k-1)+2}^{(C)}, \ldots, i_{L(k)}^{(C)}]$, given by $$\gamma_k = \frac{1}{L} \sum_{m=L(k-1)+1}^{Lk} \|h_{i_m}\|^2$$

and min( ) denotes the minimum value of the entries within the parenthesis.

Figure 9:
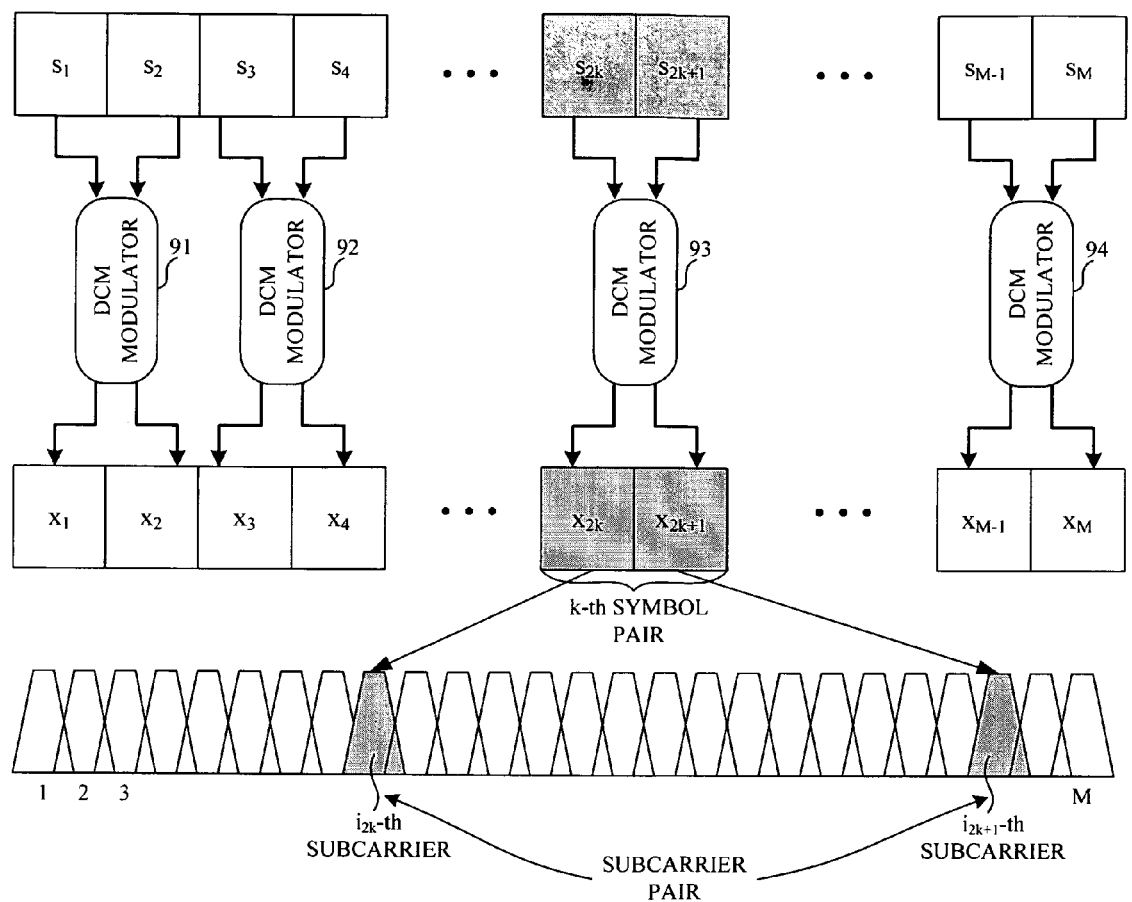
FIG. 9 illustrates dynamic tone grouping that involves dual carrier modulation (DCM).

Although dynamic tone grouping is applicable with any MC-QAM group size L, a common application of DTG involves an OFDM system that employs MC-QAM group size of L equals to two. This type of modulation is referred to as Dual Carrier Modulation (DCM). FIG. 9 illustrates the main signal processing involved in applying DTG with DCM. As illustrated in FIG. 9, consecutive pairs of QAM symbols $s_k$=[$s_{2k}$, $s_{2k+1}$], carried in a single OFDM symbol, are transformed using the DCM operation, a linear transformation to the complex symbol pair $x_k$=[$x_{2k}$, $x_{2k+1}$] by K=M/2 DCM modulators (e.g., 91-94 depicted). The real and imaginary parts of $x_k$=Re[$x_k$]+jIm[$x_k$] are computed as Re[$x_k$]=$W_{Re}$ Re[$s_k$], and Im[$x_k$]=$W_{Im}$ Im[$s_k$], where $W_{Re}$ and $W_{Im}$ denote real-valued 2*2 transformation matrices, normally unitary matrices. The symbol pair $x_k$=[$x_{2k}$, $x_{2k+1}$], referred to as a k-th DCM symbol pair, is then mapped to a corresponding pair of OFDM subcarriers with indices $i_{2k}$ and $i_{2k+1}$.

While DTG improves overall performance of the communication link, additional signaling overhead is introduced between a transmitter and its corresponding receiver. As illustrated earlier, the DTG operation is equivalent to deriving i=[$i_1, i_2, i_3, \ldots, i_k, \ldots, i_K$], a permutation of subcarrier indices 1, 2, 3, . . . , M, such that each MC-QAM symbol group is mapped to a corresponding subcarrier group to achieve improved link performance. Therefore, the permutation of subcarriers indices, i.e., the DTG tone mapping information used by a transmitter, need to be informed to a corresponding receiver at the other end of the communication link. In one scenario, because the DTG operation is based on channel state information (CSI) typically known by the receiver, the receiver determines the tone mapping information and then informs its corresponding transmitter such information. In another scenario, the transmitter determines the DTG tone mapping information and informs the information to its corresponding receiver. In order to communicate the DTG tone mapping information between the transmitter and receiver, the subcarrier indices i=[$i_1, i_2, i_3, \ldots, i_k, \ldots, i_K$] that correspond to K equal subsets of L subcarriers need to be encoded into a sequence of bits. If M is relatively a large number (e.g., M=256), then a large number of encoded bits is required for transmitting the DTG tone mapping information. For example, it typically requires $M*\log_2 M$ number of bits to encode the DTG tone mapping information. In one novel aspect, block-wise DTG scheme and efficient tone mapping information encoding scheme are used to reduce signaling overhead.

Figure 10:
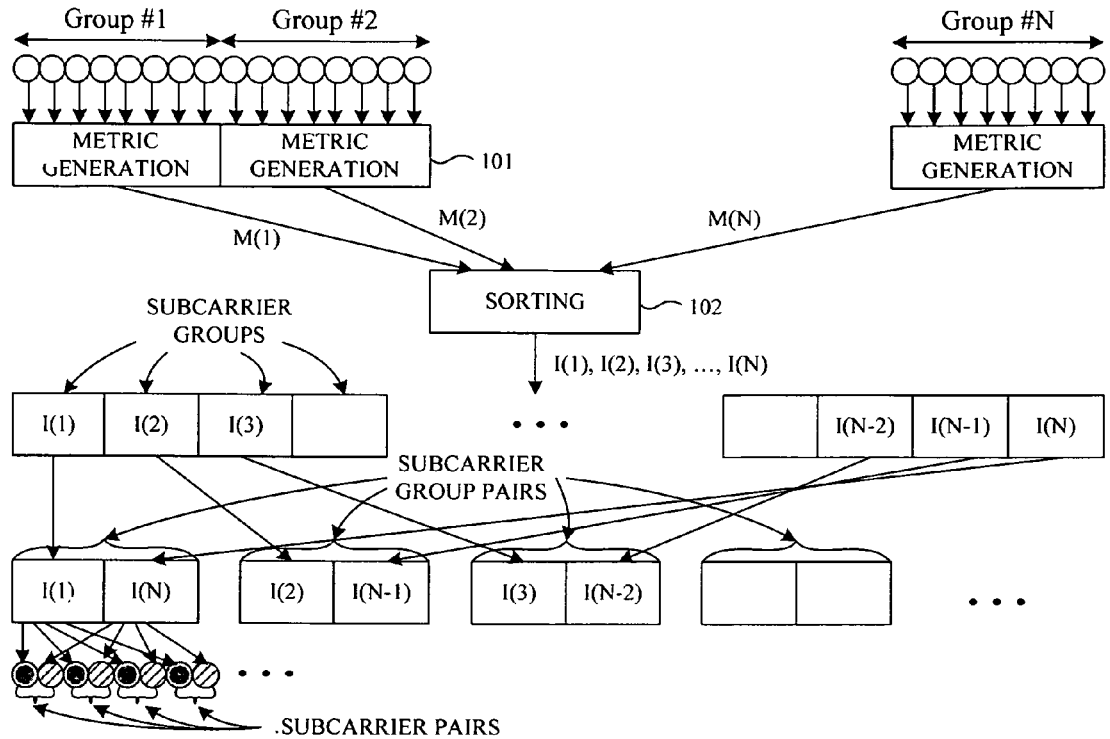
FIG. 10 illustrates block-wise dynamic tone grouping that pairs subcarrier groups and assigns DCM symbol pairs to paired subcarrier groups.

FIG. 10 illustrates block-wise dynamic tone grouping that pairs subcarrier groups and assigns DCM symbol pairs to each paired subcarrier group. Under block-wise DTG, consecutive subcarriers are first sliced into N groups, and each group contains an equal number of consecutive subcarriers. The metrics of the subcarrier groups, M(1), M(2), M(3), . . . , and M(N) are then calculated by a Metric generation block (e.g., 101 as depicted). The metric generation criterion may include but not limited to the mean, the median, the geometric mean, or the minimum of the channel responses in the subcarrier group. Next, the generated metrics are fed into a sorting block 102 to get the indices of the N subcarrier groups, 41), I(2), I(3), . . . , and I(N), in the ascending or descending order of the metric or according to some other criteria. Finally, the paring process makes P(I(1), I(N)), P(I(2), I(N−1)), P(I(3, I(N−2)), . . . as the pairs of the subcarrier groups. In addition, within each paired subcarrier group, one subcarrier from each subcarrier group is selected to form a subcarrier pair, as shown in FIG. 10. Each subcarrier pair is then mapped to a pair of DCM symbol. This selection is normally based on a predetermined rule. For example, within subcarrier group pair P(I(1), I(N)), the first subcarrier in subcarrier group I(1) is paired with the first subcarrier in subcarrier group I(N); and the second subcarrier in subcarrier group I(1) is paired with the second subcarrier in the subcarrier group I(N); . . . and so on so forth.

Figure 11:
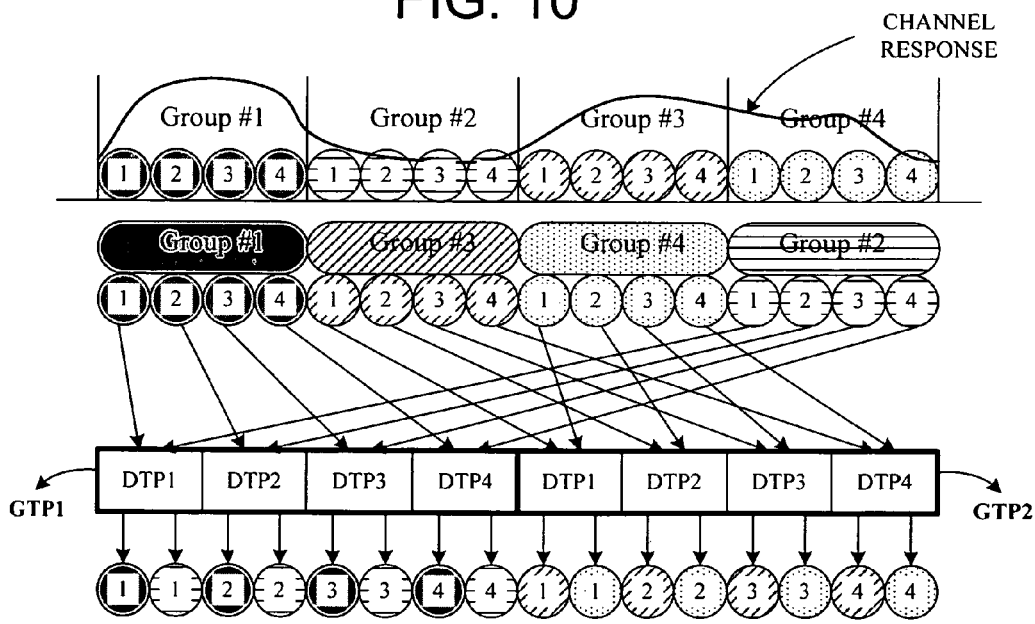
FIG. 11 illustrates one embodiment of tone grouping that is used in block-wise dynamic tone mapping.

FIG. 11 illustrates one example of block-wise dynamic tone grouping in more detail. In the example of FIG. 11, a total of M=16 subcarriers are grouped into N=4 groups (group #1 to group #4). Each group has four consecutive subcarriers, indexed by subcarrier indices 1, 2, 3 and 4. As shown in FIG. 11, the consecutive subcarriers in each group have similar channel response and together produce corresponding metrics M(1) to M(4). The subcarrier groups are then sorted based on their metrics, outputting the group indices I=[1, 3, 4, 2]. The first group index I(1)=1 represents that group #1 has the best overall channel response, and the last group index I(4)=2 represents that group #2 has the worst overall channel response. The best group #1 is then paired with the worst group #2 and together they form a first subcarrier group pair P[I(1), 4)]=[1, 2] (also referred to as GTP1 in FIG. 11); the second best group #3 is paired with the second worst group #4 and together, form a second subcarrier group pair P [I(2), I(3)]=[3, 4] (also referred to as GTP2 in FIG. 11). Within each subcarrier group pair GTP1 and GTP2, four subcarrier groups (i.e., dynamic tone pairs DTP1-DTP4) are generated. For example, within P[I(1), 44)]=[1, 2], DTP1 is formed by selecting the first subcarrier from group #1 and the first subcarrier from group #2; DTP2 is formed by selecting the second subcarrier from group #1 and the second subcarrier from group #2, and so on so forth. Eight DTPs are then mapped to eight DCM symbol pairs.

By using block-wise dynamic tone group, the original number of subcarriers M are reduced to number of subcarrier groups N=M/B, where B is the block size, i.e., the number of subcarriers in each group. Therefore, instead of encoding the subcarrier indices, only subcarrier group indices need to be encoded and communicated to the other side of the communication link. As a result, only $N*Log_2N$ number of bits are required for encoding the DTG tone mapping information. Furthermore, the block size B can be configured based on different network environment and channel state. When the coherence bandwidth of the channel is large, the channel frequency variation is not significant. Thus, the number of subcarriers in each group (i.e., block size B) can be increased to reduce N and the corresponding DTG encoding size. With the adaptive selection of block size B, the DTG encoding size can be scalable with different channel condition and/or network load.

Under block-wise DTG scheme, the DTG tone mapping information can be encoded using partial index encoding or partial pair encoding to further reduce signaling overhead. With partial index encoding, a subcarrier group pair is first selected using one group index according to a rule, and the other group index of the selected subcarrier group pair is encoded. In one embodiment, the rule selects a subcarrier group pair that contains the minimum or maximum group index in the remaining pool. Besides the minimum or maximum rule, other unique rules are also possible. If the total number of subcarrier groups is equal to N, then only $(\frac{1}{2})*N*[\log_2 N]$ number of bits is required to encode the entire DTG tone mapping information. For example, suppose there are eight subcarrier groups, and the four subcarrier group pairs are P(3, 4), P(1, 6), P(7,8), and P(2,5). After sorting under the minimum rule, the subcarrier group pairs become P(1, 6), P(2, 5), P(3,4), and P(7,8). The group indices to be encoded are 6, 5, 4, 8, which may be encoded using only 12 bits.

With partial pair encoding, only the subcarrier group pairs with large metric difference are encoded. The remaining subcarrier group pairs can be determined using a predefined rule known by both the transmitter and the receiver. This is because only tone pairs whose metric difference is large affect the system performance significantly. For example, if two frequency tones with the worst channel response are paired together, then data received on such subcarrier pair is more likely to be in error. On the other hand, frequency tones with moderate channel response are likely not to affect the system performance regardless of how those tones are paired. Suppose the number of subcarrier groups N=8, and the pairs with large metric difference are P(3, 7) and P(1, 5). In one example, both the number of selected pairs=2 and corresponding indices of subcarrier group pairs 3, 7, 1, 5 are encoded and transmitted to/from the receiver. In another example, a flag identifying the groups to be paired (i.e., groups 1, 3, 5, 7) is first constructed (i.e., flag=[1, 0, 1, 0, 1, 0, 1, 0]), and the selected pairs are then encode using the partial index encoding scheme (i.e., the two pairs are sorted and indices of groups 5 and 7 are encoded). Both the flag and the encoded group indexed are then transmitted to/from the receiver.

Figure 12:
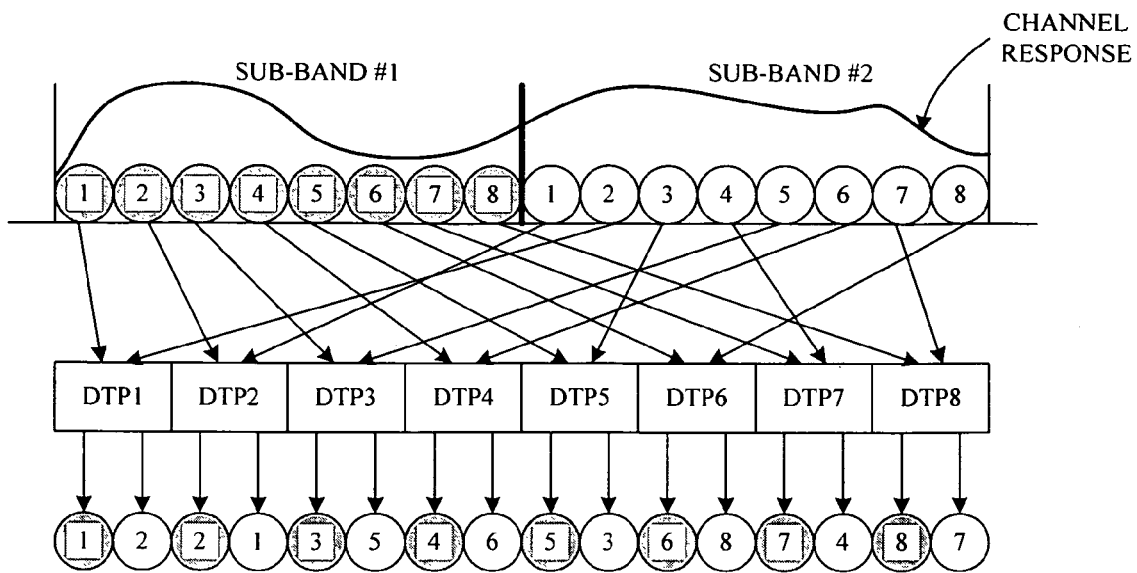
FIG. 12 illustrates one embodiment of band splitting that is used in dynamic tone mapping.

In addition to block-wise DTG scheme, band splitting can also be used as one of the DTG schemes. FIG. 12 illustrates one embodiment of band splitting that is used in dynamic tone grouping. Under band splitting, the entire subcarriers are first divided into dual bands, sub-band #1 and sub-band #2. A subcarrier pair is then formed by selecting one subcarrier from sub-band #1 and one subcarrier from sub-band #2 based on channel quality information of each subcarrier. As illustrated in FIG. 12, the subcarriers with relatively good channel response are paired with subcarriers with relatively poor channel response such that each subcarrier pair has overall balanced channel response. For band splitting, only subcarrier indices from sub-band #2 need to be encoded. For example, eight subcarrier groups (i.e., dynamic tone pairs DTP1-DTP8) (1,2), (2,1), (3, 5), (4, 6), (5, 3), (5, 8), (7, 4), and (8,7) are created using band splitting, and subcarrier indices of subcarrier 2, 1, 5, 6, 3, 8, 4, and 7 from sub-band #2 are encoded and transmitted to/from a corresponding receiver.

Figure 13:
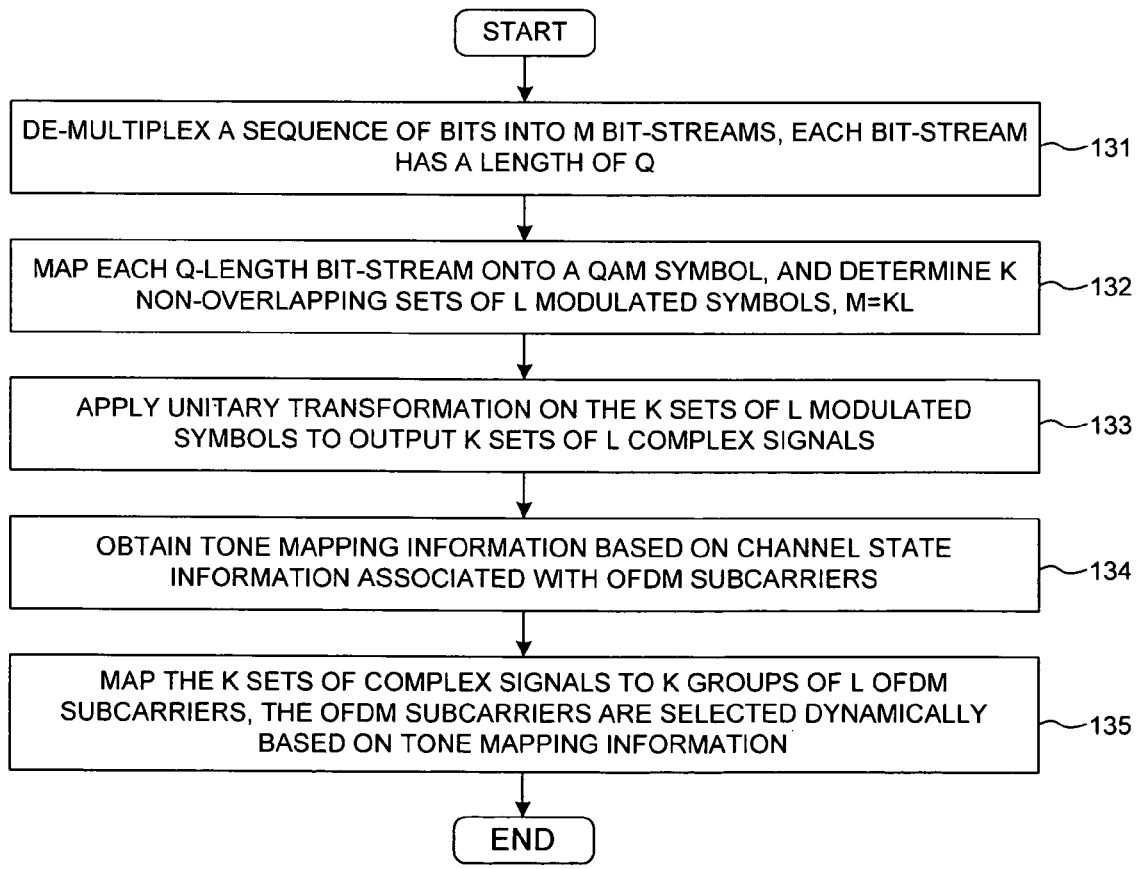
FIG. 13 is a flow chart of a method of dynamic tone grouping in a wireless OFDM system.

FIG. 13 is a flow chart of a method of dynamic tone grouping used by a transmitter in a wireless OFDM system. Consider an OFDM system that employs M OFDM subcarriers carrying a total of MQ bits. First, a sequence of coded and interleaved bits of length MQ is de-multiplexed into M bit-streams b, each bit-stream of length Q (step 131). Next, each Q-length bit-stream is mapped into a sequence of M $2^Q$-QAM symbols s, which are grouped into K non-overlapping sets of L QAM symbols, where M=KL (step 132). Unitary transformation is then applied on the K=M/L non-overlapping sets of L QAM symbols s to produce K sets of complex signals x (step 133). DTG tone mapping information is then obtained by the transmitter in step 134. The tone mapping information is derived from certain information associated with the subcarriers, such as channel state information (CSI). The M subcarriers in the OFDM system are grouped into subcarrier groups according to the tone mapping information such that the channel quality of each subcarrier group is balanced. In addition, the tone mapping information is encoded and transmitted to/from a corresponding receiver. Finally, the complex signals x are mapped to the subcarrier groups based on the tone mapping information (step 135).

In one or more exemplary embodiments, the functions described may be implemented in hardware, software, firmware, or any combination thereof. If implemented in software, the functions may be stored on or transmitted over as one or more instructions or code on a computer-readable (processor-readable) medium. Computer-readable media include both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that both can be used to carry or store desired program code in the form of instructions or data structures, and can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and blue-ray disc where disks usually reproduce data magnetically, while discs reproduce data optically with lasers. Combinations of the above should also be included within the scope of computer-readable media.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   (a) de-multiplexing a sequence of bits into M bit-streams, wherein each bit-stream has a length of Q;
   (b) mapping each Q-length bit-stream onto a constellation point in accordance with a $2^Q$ constellation pattern and determining K non-overlapping sets of L modulated symbols, wherein K and L are integers and M=KL;
   (c) applying an unitary transformation on the K non-overlapping sets of L modulated symbols to output K sets of L complex signals; and
   (d) mapping the K sets of L complex signals to K groups of L OFDM subcarriers, wherein subcarriers in at least some of the OFDM subcarrier groups are selected dynamically based on tone mapping information, wherein (a) to (d) are performed by a transmitter in a wireless OFDM system.

2. The method of claim 1, wherein the tone mapping information is derived from channel state information (CSI) associated with the K groups of L OFDM subcarriers.

3. The method of claim 2, wherein the tone mapping information is derived from at least one of power level, signal to noise ratio, signal to interference plus noise ratio, capacity, and mutual information.

4. The method of claim 2, wherein subcarriers with the best and the worst channel quality are substantially evenly distributed among the K subcarrier groups, and wherein subcarriers with moderate channel quality are arbitrarily distributed among the K subcarrier groups.

5. The method of claim 1, wherein the mapping in (d) involves selecting the OFDM subcarrier groups such that variance of the mean power corresponding to the subcarrier groups is substantially minimized.

6. The method of claim 1, wherein the mapping in (d) involves selecting the OFDM subcarrier groups such that minimum of the mean power corresponding to the subcarrier groups is substantially maximized.

7. The method of claim 1, wherein the mapping in (b) is referred to as dual carrier modulation (DCM), and wherein the integer L is equal to two.

8. The method of claim 1, further comprising:
   communicating the tone mapping information with a corresponding receiver in the wireless OFDM system.

9. A transmitter in a wireless OFDM system, comprising:
   a QAM mapper that maps each Q-length bit-streams onto a constellation point in accordance with a $2^Q$ constellation pattern, wherein the QAM mapper also determines K non-overlapping sets of L modulated symbols, and wherein K and L are integers and M=KL is the total number of bit-streams;
   a unitary precoder that applies an unitary transformation on the K non-overlapping sets of L modulated symbols to output K sets of L complex signals; and
   a tone mapper that maps the K sets of L complex signals to K groups of L OFDM subcarriers, wherein subcarriers in at least some of the OFDM subcarrier groups are selected dynamically based on tone mapping information derived from channel state information.

10. The transmitter of claim 9, wherein subcarriers with the best and the worst channel quality are substantially evenly distributed among the K subcarrier groups, and wherein subcarriers with moderate channel quality are arbitrarily distributed among the K subcarrier groups.

11. The transmitter of claim 9, wherein the QAM mapper performs dual carrier modulation (DCM), and wherein the integer L is equal to two.

12. The transmitter of claim 9, wherein the tone mapping information is communicated with a corresponding receiver in the OFDM system.

13. A method, comprising:
   generating a plurality of pairs of dual carrier modulation (DCM) symbols by a transmitter in a wireless OFDM system;
   obtaining tone mapping information based on channel state information associated with a plurality of OFDM subcarriers; and
   mapping each pair of DCM symbols to a corresponding pair of OFDM subcarriers, wherein at least some of the OFDM subcarrier pairs are paired dynamically based on the obtained tone mapping information.

14. The method of claim 13, wherein the tone mapping information is communicated with a corresponding receiver in the OFDM system.

15. The method of claim 13, wherein the plurality of OFDM subcarriers are grouped into a number of subcarrier groups, wherein every two subcarrier groups are paired to form one subcarrier group pair, and wherein two subcarriers from each subcarrier group pair are paired based on a predefined rule to form a pair of OFDM subcarriers that is mapped to a corresponding pair of DCM symbols.

16. The method of claim 15, wherein each subcarrier groups comprises a number of consecutive subcarriers, and wherein the number of consecutive subcarriers is in turn determined based on channel condition.

17. The method of claim 15, wherein the subcarrier group pairs are sorted according to the minimal index of each pair, and wherein the tone mapping information comprises the larger group indices of each subcarrier group pair.

18. The method of claim 15, wherein the tone mapping information comprises group indices of a selected subcarrier group pairs and a total number of the selected subcarrier group pairs.

19. The method of claim 13, wherein the plurality of OFDM subcarriers is grouped into two sub-bands, and wherein one OFDM subcarrier from each sub-band is selected to form a pair of OFDM subcarriers that is mapped to a corresponding pair of DCM symbols.

20. The method of claim 19, wherein the tone mapping information comprises subcarrier indices of one of the sub-bands.

21. A non-transitory computer-readable medium storing instructions that, when executed by a processor, cause the processor to perform a method, the method comprising:
   generating a plurality of pairs of dual carrier modulation (DCM) symbols by a transmitter in a wireless OFDM system;

obtaining tone mapping information based on channel state information associated with a plurality of OFDM subcarriers; and mapping each pair of DCM symbols to a corresponding pair of OFDM subcarriers, wherein at least some pairs of OFDM subcarriers are paired dynamically based on the obtained tone mapping information.

22. The non-transitory computer-readable medium of claim 21, wherein the plurality of OFDM subcarriers are grouped into a number of subcarrier groups, wherein every two subcarrier groups are paired to form one subcarrier group pair, and wherein two subcarriers from each subcarrier group pair are paired based on a predefined rule to form a pair of OFDM subcarriers that is mapped to a corresponding pair of DCM symbols.

23. The non-transitory computer-readable medium of claim 22, wherein the tone mapping information comprises a number of subcarrier group indices.

24. The non-transitory computer-readable medium of claim 21, wherein the plurality of OFDM subcarriers is grouped into two sub-bands, and wherein one OFDM subcarrier from each sub-band is selected to form a pair of OFDM subcarriers that is mapped to a corresponding pair of DCM symbols.

25. The non-transitory computer-readable medium of claim 24, wherein the tone mapping information comprises subcarrier indices of one of the sub-bands.

* * * * *